Oct. 9, 1945.  T. W. DOMINICK  2,386,199
RELIEF MAP BASE
Filed July 11, 1944
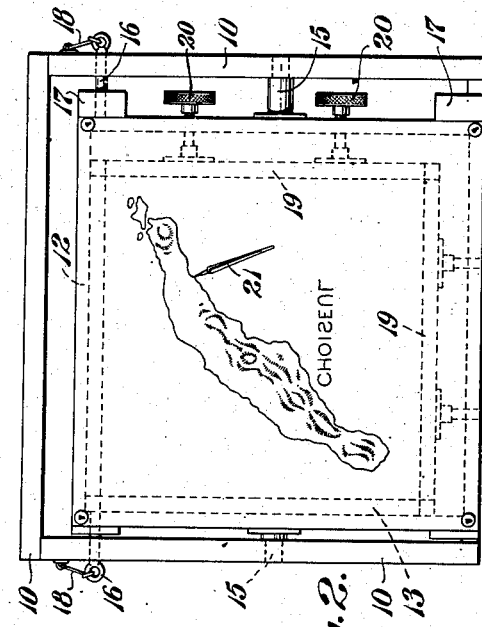
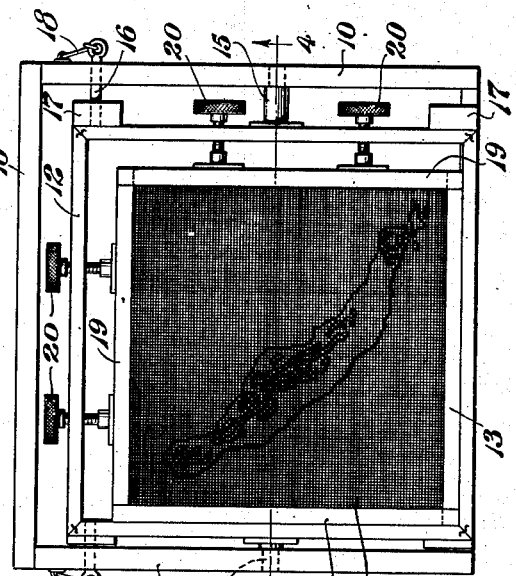
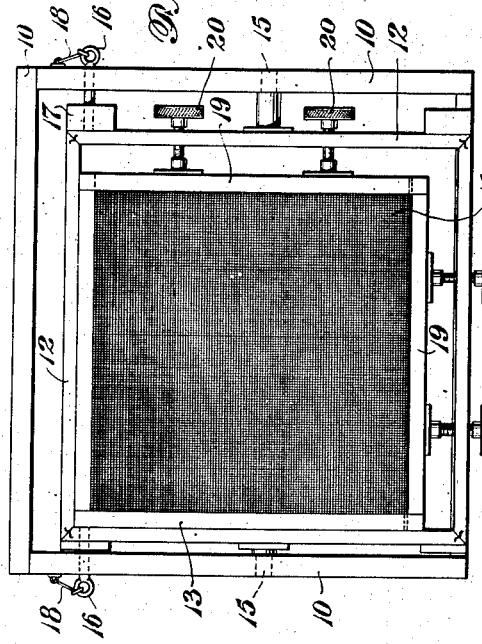
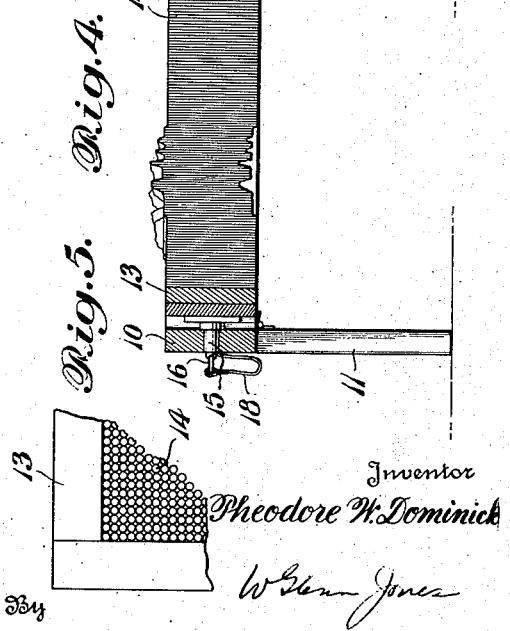
Inventor
Theodore W. Dominick
By W. Glenn Jones
Attorney Patented Oct. 9, 1945

2,386,199

UNITED STATES PATENT OFFICE 2,386,199

RELIEF MAP BASE

Theodore Weston Dominick, United States Navy

Application July 11, 1944, Serial No. 544,456

5 Claims. (Cl. 35—41)

(Granted under the act of March 3, 1883, as amended April 30, 1928; 370 O. G. 757)

The present invention relates to a relief map base.

Heretofore, relief maps have consisted of contour shapes cut from cardboard or other material, which either is of or must be built up to the required thickness to represent the scale elevation. These shapes are cemented in sequence and then the assembled shapes are covered with a desired material to simulate a terrain.

This previous construction of relief map bases has proven unsatisfactory in that excessive time is required to cut and cement together the contour shapes; a large supply of material from which to cut the various contour shapes must be on hand, and in the majority of cases there is small salvage of material after the base is no longer required, thus adding to the cost of construction.

My invention overcomes the above unsatisfactory conditions in that no cumbersome supply of contour-shaping or cementing material is necessary, and wastage of material is reduced to a minimum since the device is adjustable to register any contour combinations and can be readily reset and changed to form other bases.

The device consists of an adjustable frame holding a plurality of pins or rods of substantially equal size that are depressed by a suitable tool from the horizontal or datum level so that successive contours can be traced by the pins or rods in plane. All pins or rods within each contour perimeter and plane are adjusted equally so that accurate elevations or depressions may be formed. The pins or rods are firmly held in the desired contour shapes by adjustable lateral compression mechanisms bearing against the frame.

It is an object of the invention to provide a means for easily and quickly constructing relief maps for military training purposes.

It is a further object of the invention to provide a means for making relief map bases, which means can be used repeatedly for making bases of the same or different terrain.

Another object of the invention is to provide a base for a relief map that may be adjusted to conform topographical contours of various shapes and sizes by the movement of pins or rods.

With the above and other objects in view, the invention consists in the construction, combination and arrangement of parts as will be described more fully hereinafter.

Reference is to be had to the accompanying drawing, forming a part of this specification, in which like reference characters indicate corresponding parts throughout the various views, and in which Fig. 1 is a plan view of the invention prior to shaping the map contours, Fig. 2 is a plan view of the invention showing a topographical map in position from which to register the relief map, Fig. 3 is a plan view showing a completed register prior to the application of a covering, Fig. 4 is a section on the line 4—4 of Fig. 3, and Fig. 5 is an enlarged plan of a portion of the pins and holding frame.

Referring more particularly to the drawing, the relief map base is mounted in a support consisting of three side members 10 and legs 11 arranged at the four corners to provide adequate stability for the support. The legs, if desired, may be conventionally hinged so that they will fold alongside the support proper for conservation of space in transportation. The map base itself consists of a pivoted frame 12 and an adjustable open inner frame 13 for holding a plurality of contour-shaping pins or rods 14.

The frame 12 is pivotally mounted in the opposed side members of the support, as at the points 15, and is held in either one of two positions by fastening elements 16 engaging in suitable receptacles 17. The fastening elements are preferably secured to the support against loss by hooks 18. The pins or rods are held in their frame in frictional engagement with one another by pressure applied against movable sides 19 of the inner frame 13 by screw clamps 20. The lengths and diameters of the pins or rods may vary in accordance with the elevation requirements of the different areas to be reproduced, but the dimensions of those to be used in preparing any one relief base should be substantially equal.

In use, the inner frame 13 is turned so that its under side is uppermost, as shown in Fig. 1, then a chart or map showing the topographic characteristics of the area to be reproduced in relief is fastened in any desired manner to the frame as in Fig. 2, and the pins or rods are depressed by a suitable calibrated stylus or punch 21 so as to project from the opposite side, as may be seen in Fig. 4, to form the contours of the relief map to be constructed. When the surface has been conformed in agreement with the topographical data available, the screw clamps 20 are tightened to prevent any further undesired movement of the pins or rod. The frame 13 is then swung on its pivots to bring the projected surface uppermost, and papier-mâché in its moist state, or a desirable plastic material is conformed to the surface defined by the pins or rods, and permitted to harden. The article thus formed can be ornamented, if desired, to further simulate the topography depicted.

Although the device is primarily intended for the purpose of preparing what may be termed "temporary" maps, it may be used also to construct substantially "permanent" relief maps. Such permanent maps may be made by using the side of the relief base that has the depressions caused by moving the pins or rods to form the projections for the contours of the temporary relief map. After the compression members have been tightened to hold the pins or rods firmly in the desired position, a plaster or other suitable composition may be poured over the depressed ends of the pins or rods and allowed to harden. When sufficiently hardened the pins or rods may be easily removed leaving a more or less permanent map that may be used for future reference.

It will be understood that the above description and accompanying drawing comprehend only the general and preferred embodiment of my invention and that various changes in details of construction, proportion and arrangement of parts may be made without sacrificing any of the advantages of my invention.

The invention described herein may be manufactured and used by or for the Government of the United States of America for governmental purposes without the payment of any royalties thereon or therefore.

What I claim is:

1. A device for forming bases for relief maps, comprising a support, a frame rotatable in the support on an axis normal thereto, a clamping frame mounted in the rotatable frame, a plurality of rods held within the clamping frame, said rods being substantially of equal length with their opposite end surfaces initially forming substantially parallel planes, and compressive members operable upon the clamping frame.

2. A device for forming bases for relief maps comprising a three sided support, a frame rotatably mounted in the support on an axis normal thereto, a clamping frame carried by the rotatable frame, a plurality of rods mounted in the clamping frame with their longitudinal axes parallel to the longitudinal axis of the support, said rods being of substantially equal length with their end surfaces initially forming substantially parallel planes, and means for compressing the clamping frame.

3. A device for forming bases for relief maps comprising a support, a clamping frame, a plurality of rods held within said clamping frame, said rods being of equal length and positioned initially by said frame so that the opposite end surfaces of said rods form substantially parallel planes, and means for mounting said clamping frame on said support for rotation on an axis normal to the longitudinal axis of the rods whereby the reverse side of the frame may be used as a mold for making a permanent relief map.

4. A device for forming bases for relief maps comprising a support, a frame carried by the support and rotatable on an axis normal thereto, a clamping frame movable with said rotatable frame, a plurality of rods held within the clamping frame, said rods being substantially of equal length with their end surfaces initially forming parallel planes, and means for compressing the clamping frame.

5. A device for forming bases for relief maps comprising a support, a rotatable frame mounted within the support, a clamping frame carried by the rotatable frame, a plurality of rods held within the clamping frame, said rods having their end surfaces initially forming substantially parallel planes, and means for mounting said rotatable frame on the support for movement on an axis normal to the support whereby either surface formed by the rods becomes a working area.

THEODORE WESTON DOMINICK.